US009652623B2

(12) United States Patent
Asano

(10) Patent No.: US 9,652,623 B2
(45) Date of Patent: May 16, 2017

(54) ELECTRONIC ADDRESS BOOK STORING APPARATUS AND METHOD FOR STORING ELECTRONIC ADDRESS BOOK

(71) Applicant: Oki Data Corporation, Tokyo (JP)

(72) Inventor: Yoko Asano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 37 days.

(21) Appl. No.: 14/610,278

(22) Filed: Jan. 30, 2015

(65) Prior Publication Data

US 2015/0220750 A1  Aug. 6, 2015

(30) Foreign Application Priority Data

Jan. 31, 2014 (JP) ................................ 2014-017511

(51) Int. Cl.
*G06F 7/04* (2006.01)
*G06F 21/62* (2013.01)
*G06Q 10/10* (2012.01)

(52) U.S. Cl.
CPC ............. *G06F 21/62* (2013.01); *G06Q 10/10* (2013.01); *G06Q 10/107* (2013.01)

(58) Field of Classification Search
CPC ....................................................... G06F 21/62
USPC ........................................................ 726/28
See application file for complete search history.

(56) References Cited

U.S. PATENT DOCUMENTS

| | | | |
|---|---|---|---|
| 2003/0041154 A1* | 2/2003 | Tran | G06F 21/6218 709/229 |
| 2007/0066288 A1* | 3/2007 | Soelberg | H04M 3/4931 455/415 |
| 2008/0013712 A1* | 1/2008 | Gopinath | H04M 3/4931 379/218.01 |
| 2008/0055659 A1 | 3/2008 | Uchida et al. | |
| 2010/0299396 A1 | 11/2010 | Memon et al. | |
| 2013/0047089 A1* | 2/2013 | Kulathungam | G06F 9/44 715/739 |
| 2013/0120791 A1 | 5/2013 | Fukushima | |
| 2013/0201514 A1 | 8/2013 | Terao | |

FOREIGN PATENT DOCUMENTS

| | | | | |
|---|---|---|---|---|
| CN | 103024061 A | * | 4/2013 | ............ H04L 29/06 |
| EP | 1763216 A2 | | 3/2007 | |
| EP | 2381387 A2 | | 10/2011 | |
| JP | H09-294158 A | | 11/1997 | |

* cited by examiner

*Primary Examiner* — Peter Shaw
(74) *Attorney, Agent, or Firm* — Rabin & Berdo, P.C.

(57) ABSTRACT

An electronic address book storing apparatus keeps a login user's information confidential. A destination information storing section is configured to store items of registered destination information. Each item of registered destination information including a right-of-use associated with a registered user. An information extracting section is configured to extract an item of registered destination information from the destination information storing section in response to a login user's command. The extracted item of registered destination information is associated with the login user's right-of-use. A display controller is configured to display the extracted item of registered destination information to the login user.

7 Claims, 18 Drawing Sheets

FIG.2

| USER ID INFORMATION ||
|---|---|
| USER NAME | ID INFORMATION |
| UserA | mZk739 |
| UserB | psG922 |
| UserC | Aeck86 |

FIG.3

| ADDRESS BOOK |
|---|
| DESTINATION INFORMATION 1 |
| DESTINATION INFORMATION 2 |
| DESTINATION INFORMATION 3 |
| DESTINATION INFORMATION 4 |
| DESTINATION INFORMATION 5 |
| DESTINATION INFORMATION 6 |
| DESTINATION INFORMATION 7 |
| DESTINATION INFORMATION 8 |

FIG.4

DESTINATION INFORMATION = DESTINATION TYPE + RIGHT-OF-USE

FIG.5

| NAME (NAME) |
| --- |
| MAIL1 (EMAIL ADDRESS 1) |
| MAIL2 (EMAIL ADDRESS 2) |
| TEL1 (TELEPHONE NUMBER 1) |
| TEL2 (TELEPHONE NUMBER 2) |
| FAX1 (FACSIMILE NUMBER 1) |
| MEMO1 (MEMORANDUM 1) |
| MEMO2 (MEMORANDUM 2) |

FIG.6

RIGHT-OF-USE = USER NAME + ITEM NUMBER

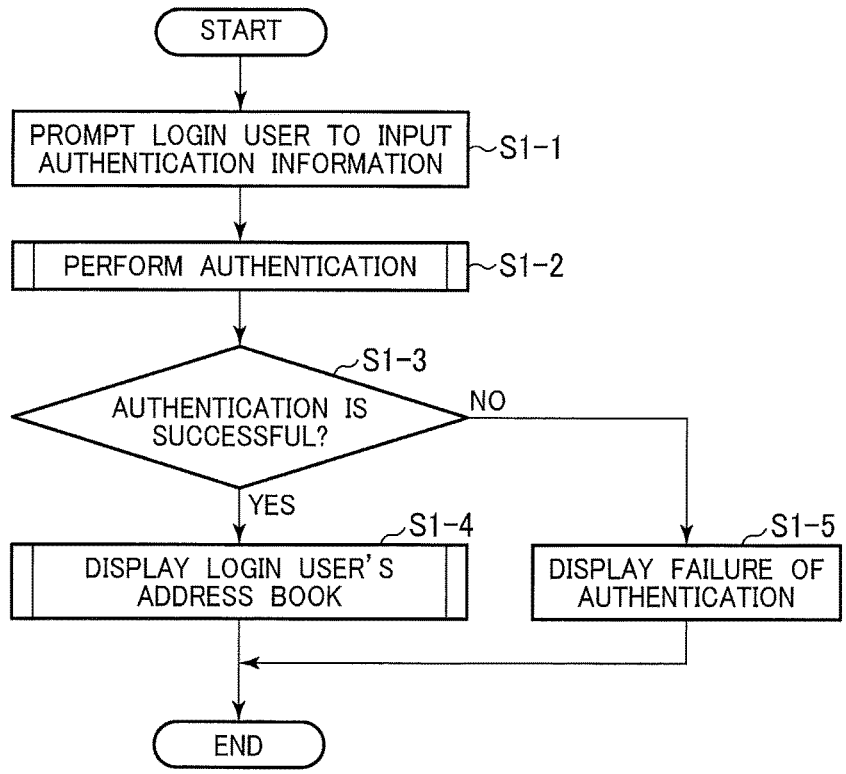
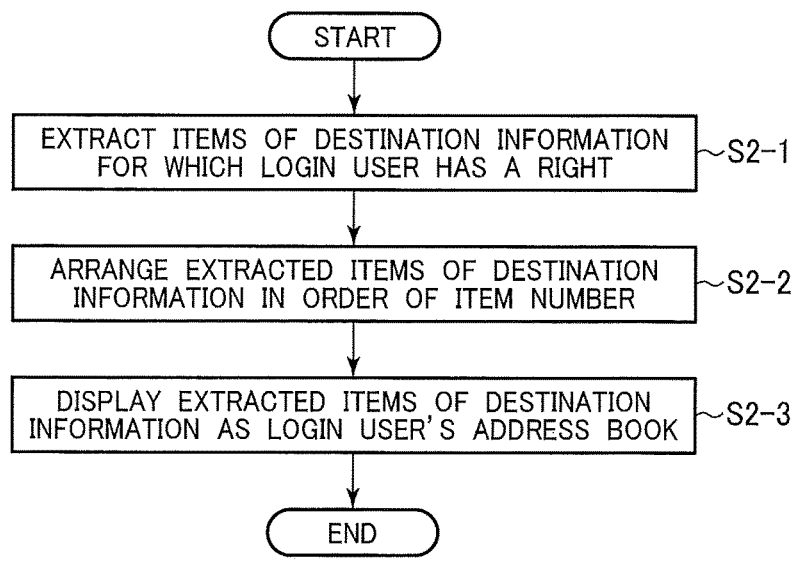

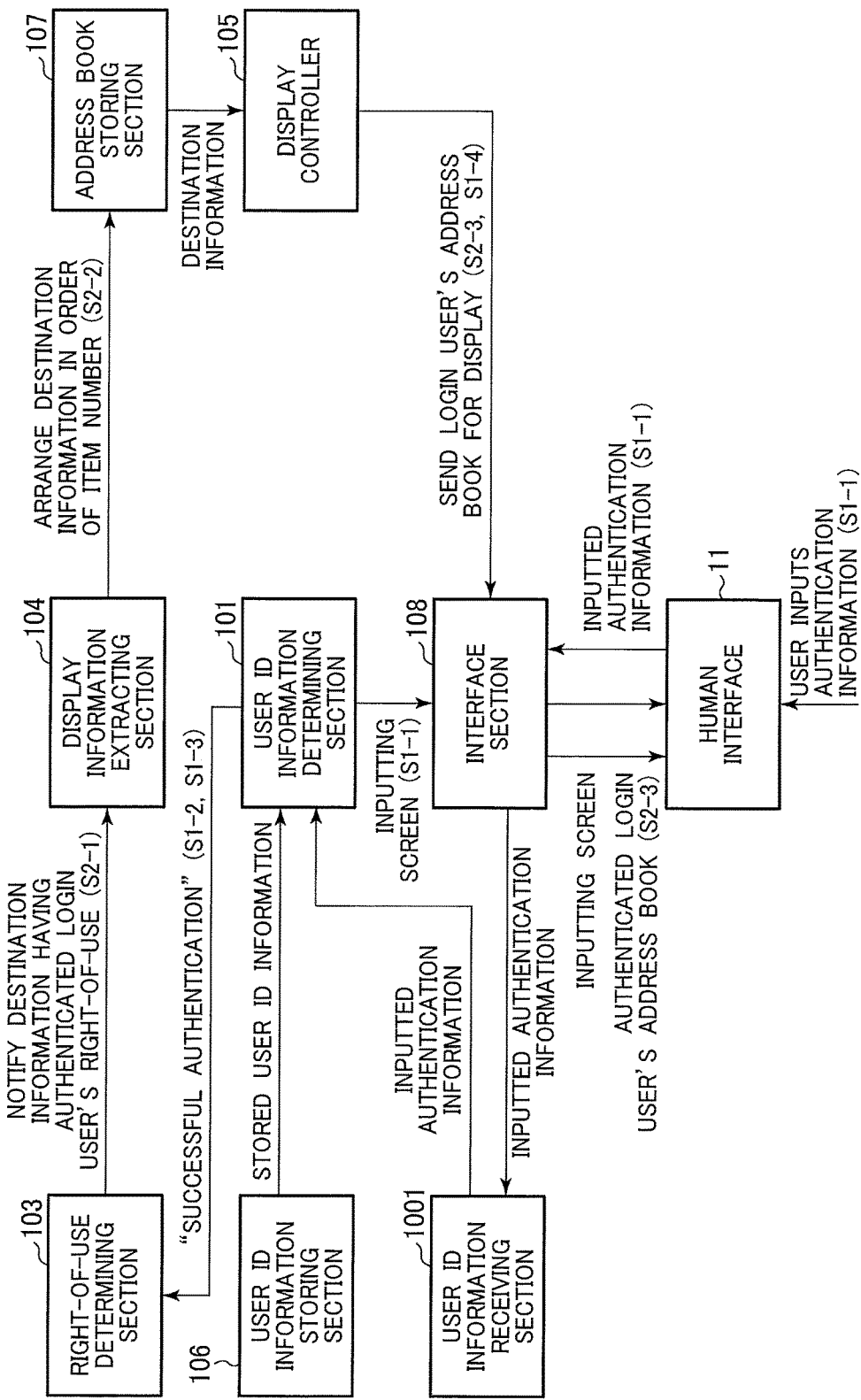

FIG.9

| DESTINATION INFORMATION #1 ||
|---|---|
| TYPE INFORMATION | RIGHT-OF-USE |
| NAME: X | UserA1, UserB5, UserC2 |
| MAIL1: aaa□×@abc. com | UserA1 |
| MAIL2: a-△◇@mail. ne.jp | UserB5 |
| TEL1: ×××-△△△-○○○○ | UserA1, UserB5 |
| TEL2: ×××-△△△-○○○× | UserC2 |
| FAX1: ×××-△△△-○○○△ | UserB5, UserC2 |
| MEMO1: COMPANY'S MAILING ADDRESS | UserA1 |
| MEMO2: REGISTERED ON: 2015/10/2 | UserC2 |

FIG.10

| DESTINATION INFORMATION #2 ||
|---|---|
| TYPE INFORMATION | RIGHT-OF-USE |
| NAME: Y | UserA2, UserB1, UserC1 |
| MAIL1: ccc△△@abc. com | UserA2 |
| MAIL2: cc○×@mail. ne.jp | UserC1 |
| TEL1: □□-xxxx-○△□□ | UserB1 |
| FAX1: □□-xxxx-xx△○ | UserA2 |
| MEMO1: COMPANY'S MAILING ADDRESS | UserA2 |
| MEMO2: MOBILE PHONE ADDRESS | UserC1 |

FIG.11

| DESTINATION INFORMATION #3 ||
|---|---|
| TYPE INFORMATION | RIGHT-OF-USE |
| NAME: Z | UserA3 |
| MAIL1: dd△□@abc. com | UserA3 |

FIG.12

| No. | NAME | MAIL ADDRESS | TELEPHONE NUMBER | FAX NUMBER | MEMORANDUM |
|---|---|---|---|---|---|
| 1. | X | aaa□×@abc.com | xxx-△△△-OOOO | | COMPANY'S MAILING ADDRESS |
| 2. | Y | ccc△△@abc.com | | □□-xxxx-xx-△O | COMPANY'S MAILING ADDRESS |
| 3. | Z | dd△□@abc.com | | | |

FIG.13

| No. | NAME | MAIL ADDRESS | TELEPHONE NUMBER | FAX NUMBER | MEMORANDUM |
|---|---|---|---|---|---|
| 1. | Y | ccO×@mail.ne.jp | | | MOBILE PHONE ADDRESS |
| 2. | X | | xxx-△△△-OOOx | xxx-△△△-OOO△ | REGISTERED ON: 2015/ |

FIG.18

| USER NAME | ITEM NUMBER | -(HYPHEN) | UPDATE FLAG 0: UPDATED 1: NOT UPDATED | UPDATED DESTINATION TYPE |

{ ITEM NUMBER, -(HYPHEN), UPDATE FLAG, UPDATED DESTINATION TYPE } = RIGHT-OF-USE

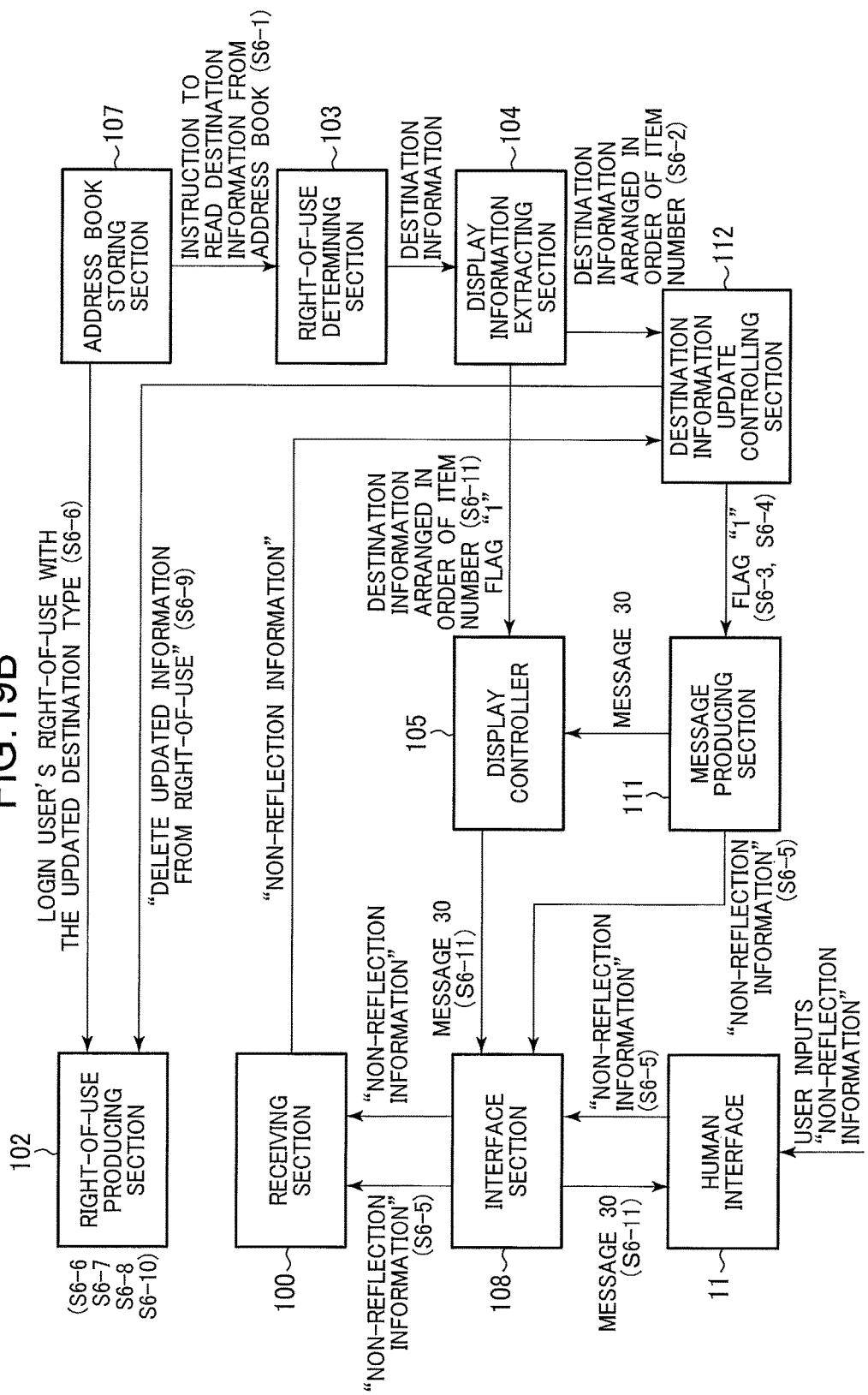

FIG.20

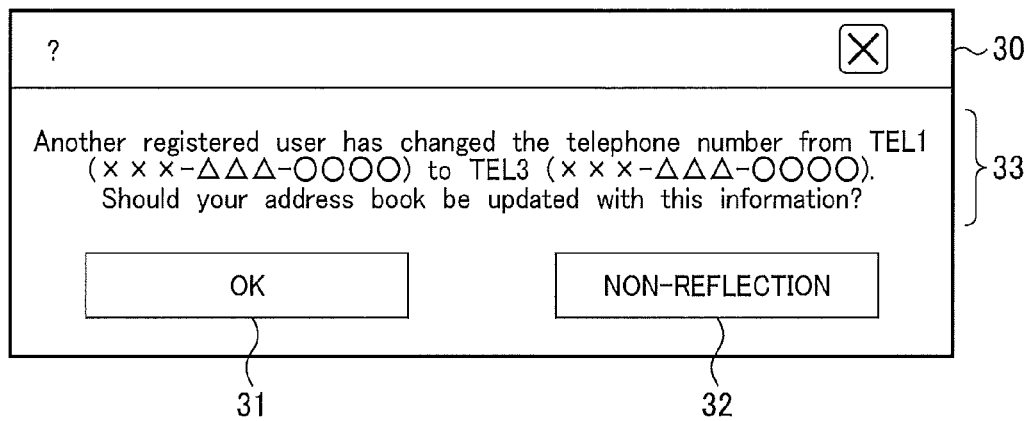

?      [X] ~30

Another registered user has changed the telephone number from TEL1 (×××-△△△-○○○○) to TEL3 (×××-△△△-○○○○). Should your address book be updated with this information? }33

[ OK ]     [ NON-REFLECTION ]

| DESTINATION INFORMATION #1 ||
|---|---|
| DESTINATION TYPE | RIGHT-OF-USE |
| NAME: X | UserA1-0, UserB5-0, UserC2-0 |
| MAIL1: aaa□×@abc. com | UserA1-0 |
| MAIL2: a-△◇@mail. ne.jp | UserB5-0 |
| TEL1: ×××-△△△-○○○○ | UserA1-1TEL3 |
| TEL2: ×××-△△△-○○○× | UserC2-0 |
| TEL3: ×××-△△△-○×○× | UserB5-0 |
| FAX1: ×××-△△△-○○○△ | UserB5-0, UserC2-0 |
| MEMO1: COMPANY'S MAILING ADDRESS | UserA1-0 |
| MEMO2: REGISTERED ON: 2015/10/2 | UserC2-0 |

ELECTRONIC ADDRESS BOOK STORING APPARATUS AND METHOD FOR STORING ELECTRONIC ADDRESS BOOK

BACKGROUND OF THE INVENTION

Field of the Invention

The present invention relates to an electronic address book storing apparatus and a method for storing an electronic address book. The invention is applicable to an electronic address book storing apparatus configured to be installed in an image processing apparatus, for example, a facsimile machine and an multi-function peripheral (MFP), and a method for storing en electronic address book.

Description of the Related Art

A conventional apparatus for storing electronic address book is configured such that each telephone book file holds corresponding registered users and when a user inputs specific identification (ID) information, he is permitted to open a corresponding telephone book file to retrieve a desired telephone number.

However, when an image processing apparatus such as a printer and an MFP includes only a single address book and the image processing is shared by a plurality of users, if a user registers destination information in the address book, that destination may be seen by other users.

There is a demand for an electronic address book storing apparatus and a method for storing an electronic address book in which when an image processing apparatus is shared by a plurality of users, the destination information registered by a user may be hidden from other users.

SUMMARY OF THE INVENTION

An object of the invention is to provide an apparatus in which the destination information registered by a user may be hidden from other users.

An electronic address book storing apparatus keeps a login user's information confidential. A destination information storing section is configured to store items of registered destination information. Each item of registered destination information including a right-of-use associated with a registered user. An information extracting section is configured to extract an item of registered destination information from the destination information storing section in response to a login user's command. The extracted item of registered destination information is associated with the login user's right-of-use. A display controller is configured to display the extracted item of registered destination information to the login user.

BRIEF DESCRIPTION OF THE DRAWINGS

The present invention will become more fully understood from the detailed description given hereinbelow and the accompanying drawings which are given by way of illustration only, and wherein:

FIG. 2 illustrates the configuration of a user ID information list stored in a user ID information storing section;

FIG. 3 illustrates the configuration of an address book stored in an address book storing section;

FIG. 4 illustrates the configuration of each item of destination information held in the address book storing section;

FIG. 5 illustrates the configuration of an item of destination information according to the first embodiment, the item of destination information including destination types;

FIG. 6 illustrates the configuration of the right-of-use associated with the destination type;

FIG. 7A is a flowchart illustrating an operation for displaying the address book;

FIG. 7B illustrates a part of the configuration of a control system of the image processing apparatus;

FIG. 8 is a flowchart illustrating how a login user's address book is displayed;

FIGS. 9-11 illustrate examples of destination information stored in the address book storing section;

FIG. 12 illustrates a screen of a human interface on which the address book for the user A is displayed;

FIG. 13 illustrates an address book displaying screen of the human interface on which the address book for the user C is displayed;

FIG. 18 illustrates the configuration of a right-of-use associated with destination type according to the second embodiment;

FIG. 19B illustrates a part of the configuration of the control system of the image processing apparatus according to the second embodiment;

FIG. 20 illustrates a screen on which a reflection inquiring message is being displayed;

FIG. 21 illustrates the configuration of destination information after a login user's right-of-use has been added to the "destination type after updating;"

DETAILED DESCRIPTION OF THE INVENTION

The present invention will be described in detail by way of preferred embodiments with reference to the accompanying drawings.

First Embodiment

A first embodiment of an electronic address book storing apparatus and a method for storing an electronic address book into the apparatus will be described.

{Configuration}

Figure 1:
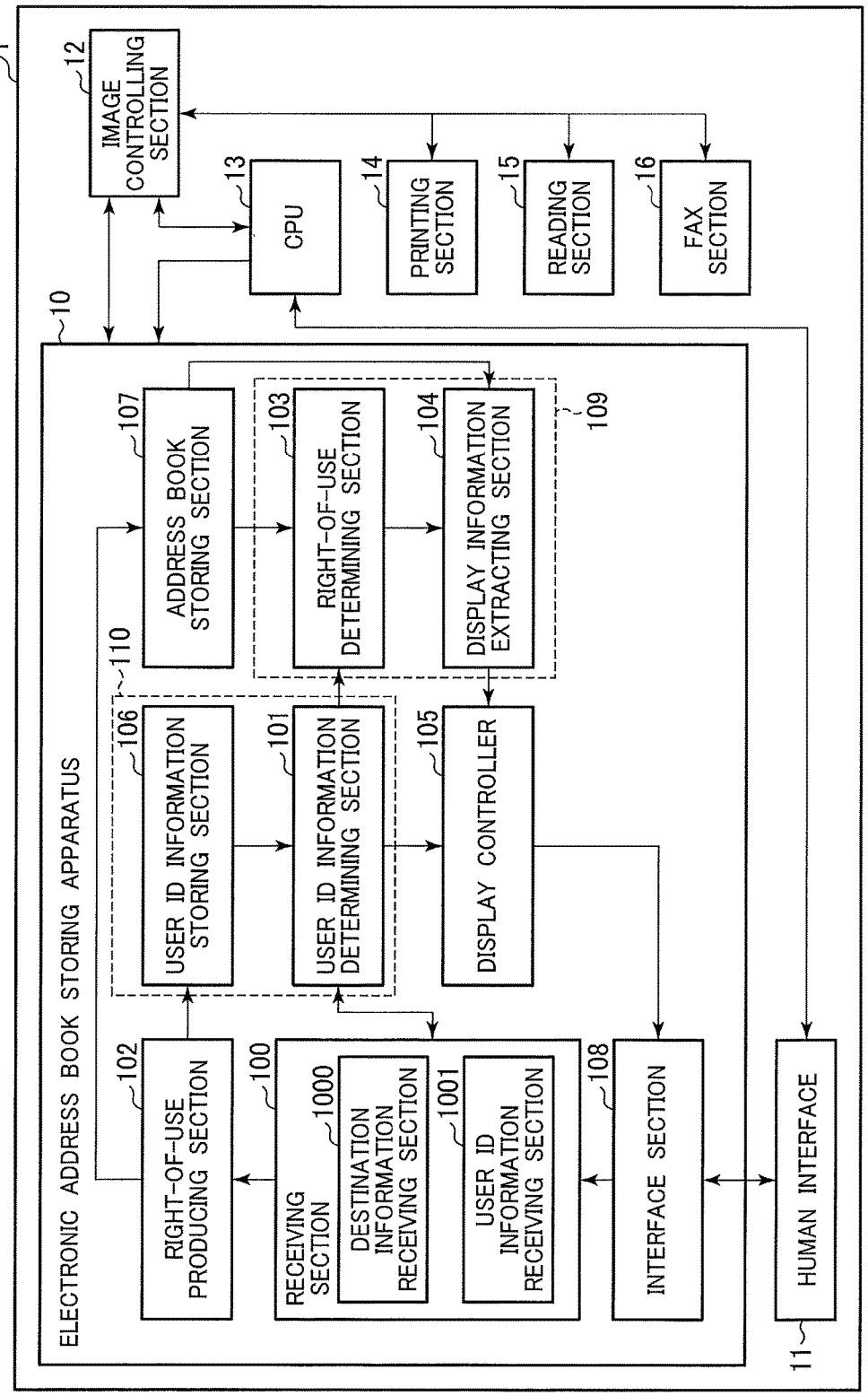
FIG. 1 illustrates the configuration of a control system of an image processing apparatus according to a first embodiment.

FIG. 1 illustrates the configuration of a control system of an image processing apparatus 1 according to the first embodiment. The image processing apparatus 1 includes an electronic address book storing apparatus 10, a human interface (inputting-and-displaying section) 11, an image controlling section 12, a central processing unit (CPU) 13, a printing section 14, a reading section 15, and a facsimile (FAX) section 16.

The image processing apparatus 1 has a communication function by which information containing images read from an original is transmitted to a destination by FAX or email. In other words, the image processing apparatus 1 may take the form of a multi-function peripheral (MFP) configured to perform a printing function, a scanning function (function of reading an original), a FAX function, and a communication function (e.g., email, telephone, FAX). Although the image processing apparatus 1 may be applied to many types of apparatus, the first embodiment will be described mainly in terms of an MFP.

The human interface 11 receives data from a login user, and displays operation screens, various types of messages, and items of information inputted by the login user. The human interface 11 functions as an operation panel for the image processing apparatus 1, and includes a liquid crystal display and button keys. The liquid crystal display may be a touch screen.

The CPU 13 executes various programs stored in a ROM to perform corresponding functions based on various items of information held in a RAM and the electronic address book storing apparatus 10.

The image controlling section 12 controls various items of image information which are handled on a function selecting screen, and which are handled in functions including printing, FAX, and scanning.

The printing section 14 performs printing under control of the CPU 13. The reading section 15 reads the image of an original under control of the CPU 13. The FAX section 16 transmits and receives information that contains data and images.

The electronic address book storing apparatus 10 stores items of destination information to which items of transmission information that contain images and data should be sent, each item of destination information being associated with a corresponding item of user ID information inputted by the login user. The user ID information is used to authenticate the login user. When the login user is successfully authenticated, the electronic address book storing apparatus 10 sends items of destination information associated with the successfully authenticated login user to the human interface 11 for display.

The image processing apparatus 1 may be shared by a plurality of registered users. Individual registered users may possibly set their desired destination names. Different destinations having corresponding FAX numbers or email addresses could have identical names. Therefore, when a login user wants to add a new destination address as one of items of destination information which will be displayed on the human interface 11, other registered user's destinations having identical destination names may be displayed together with the login user's address book simultaneously. This makes it difficult to keep items of destination information, which are used by the individual users, confidential. To keep the items of destination information confidential, the first embodiment permits each registered user to display only the items of destination information for which he the login user has a right-of-use.

The electronic address book storing apparatus 10 includes a receiving section 100 (destination information obtaining section), a user ID information determining section 101, an right-of-use producing section 102 (destination information producing section), a right-of-use determining section 103 (information extracting section), a display information extracting section 104, a display controller 105, a user ID information storing section 106, an address book storing section 107 (destination information storing section), and an interface section 108.

The address book storing section 107 constitutes a "destination information storing section." The right-of-use determining section 103 and the display information extracting section 104 constitute an "information extracting section" 109. The user ID information determining section 101 and the user ID information storing section 106 constitute a "user authenticating section" 110. The receiving section 100 constitutes a "destination information obtaining section".

The user ID information storing section 106 stores one or more items of user ID information, which are used for user authentication. FIG. 2 illustrates the configuration of a user ID information list, stored in the user ID information storing section 106 according to the first embodiment. The user ID information list has two fields: "user names" and "items of ID information" associated with the user names. For example, user name "UserA" is associated with ID information "mZk739." Each user may set his or her desired string of arbitrary numerals and/or characters as his or her ID information under certain limits.

The address book storing section 107 stores items of destination information, which are also referred to as "items of registered destination information" in the specification, and are used in the image processing apparatus 1.

FIGS. 3 to 6 illustrate the configuration of the address book stored in the address book storing section 107. Referring to FIG. 3, the address book contains one or more items of destination information. For example, the address book holds destination information #1 to destination information #8. However, the number of items of destination information registered with the address book storing section 107 is not limited.

FIG. 4 illustrates the configuration of each item of destination information held in the address book storing section 107. Each item of destination information includes "destination type" and "right-of-use" associated with "destination type."

FIG. 5 illustrates the configuration of an item of destination information according to the first embodiment, the item of destination information including destination types. The destination type is specific information that describes a destination or recipient to which information should be transmitted from the image processing apparatus 1. The examples of destination type are, the name of a destination or recipient (e.g., NAME: BUSH & LINCOLN Inc.), one or more electronic mail addresses (e.g., EMAIL1: aaa☐x@abc.com), one or more telephone numbers (e.g., TEL1: xxx-△△△-ooox), one or more facsimile numbers (e.g., FAX1: xxx-△△△-ooo△), and one or more memorandums (e.g., MEMO1: 132 Market Ave., San Francisco, Calif., which is the mailing address of BUSH & LINCOLN Inc.). The destination types are not limited to these specific examples, and may be selected according to each registered user's preference.

The address book storing section 107 does not have any specific memory area assigned to each user but the human interface 11 displays items of destination information as a login user's "address book" in response to the login user's command. When the login user commands to display his "address book," the human interface 11 displays only items of destination information for which the login user's right-of-use has been set.

FIG. 6 illustrates the configuration of the right-of-use associated with a corresponding destination type. The rightof-use includes a "user name" and an "item number." The "user name" is the name of a user who uses the image processing apparatus 1, and is a user name in the user ID information stored in the user ID information storing section 106 (FIG. 2). The "item number" is a number indicative of the order in which items of destination information are listed in the "user's address book." The right-of-use is expressed as, for example, UserA1. "UserA" indicates the "user name," and "1" following "UserA" indicates the "item number."

Through the interface section 108, the receiving section 100 receives the items of destination information and the user ID information inputted into the human interface 11. The receiving section 100 includes two sections:adestination information receiving section 1000 for obtaining the destination information inputted by the login user, and a user ID information receiving section 1001 for obtaining the user ID information inputted by the login user.

When registering the user ID information, the user ID information receiving section 1001 obtains the user name and user ID information, and then sends the user name and the user ID information to the user ID information storing section 106. The user ID information receiving section 1001 may be configured to obtain only the ID information or both the ID information and the user name from the user ID information when the login user is authenticated against items of the user ID information stored in the user ID information storing section 106.

The destination information receiving section 1000 obtains some or all of the name (NAME) of destination, electronic mail address (EMAIL), telephone number (TEL), FAX number (FAX), and memorandum (MEMO) from the item of destination information.

To perform authentication on a login user, the user ID information determining section 101 compares the ID information of the user ID information, which is inputted by the login user through the receiving section 100, with the ID information of the user ID information held in the user ID information storing section 106, thereby determining whether they coincide. If they coincide, the user ID information determining section 101 determines that the user authentication is successful. If they do not coincide, the user ID information determining section 101 determines that the user authentication is unsuccessful.

When creating the login user's address book, the right-of-use producing section 102 associates the right-of-use with the destination type obtained by the destination information receiving section 1000, thereby creating or editing the right-of-use of the destination information, and then stores the thus created or edited login user's right-of-use for the item of destination information into the address book held in the address book storing section 107.

As shown in FIG. 6, the right-of-use has the "user name" and the "item number" that appears in the screen when the items of destination information for the login user are displayed. The item number is a number indicative of the order in which items of destination information are registered in the login user's address book. The item numbers may be consecutive numbers.

When items of destination information are displayed as the "login user's address book" through the human interface 11, the right-of-use determining section 103 obtains the user authentication result from the user ID information determining section 101. The right-of-use determining section 103 then makes a decision based on the user authentication result as to whether the "login user's address book" should be displayed. If the authentication is successful, the right-of-use determining section 103 determines that the login user is a registered user, and then permits the "login user's address book" to be displayed. If the authentication is unsuccessful, the right-of-use determining section 103 determines that the login user is not a registered user, and then does not permit the "login user's address book" to be displayed.

When the right-of-use determining section 103 determines that the "login user's address book" should be displayed, the display information extracting section 104 extracts the items of destination information, associated with the login user's right-of-use, from the address book stored in the address book storing section 107. The display information extracting section 104 extracts only the destination types associated with the right-of-use, and sends the extracted destination types to the display controller 105.

In the first embodiment, the right-of-use determining section 103 and the display information extracting section 104 are described as separate sections. However, a section may be employed which performs the functions of both the right-of-use determining section 103 and the display information extracting section 104, as long as the section is capable of extracting the destination type having the associated right-of-use.

The display controller 105 drives the human interface 11 via the interface section 108 to display the destination type extracted by the display information extracting section 104.

The human interface 11 communicates data with the receiving section 100 or with the display controller 105 via the interface section 108.

{Operation of First Embodiment}

With reference to the accompanying drawings, a description will be given of the operation of the image processing apparatus 1 in which the items of destination information is displayed and the items of destination information in the address book storing section 107 are created and/or edited.

Displaying Address Book

FIG. 7A is a flowchart illustrating the operation for displaying the address book. FIG. 7B illustrates apart of the configuration of the control system of the image processing apparatus. The operation for displaying the items of destination information will be described with reference to FIG. 7A and FIG. 7B.

Step S1-1: When the login user operates the human interface 11 to command the display of items of destination information as his "address book," the CPU 13 informs the electronic address book storing apparatus 10 of the command. The user ID information determining section 101 of the electronic address book storing apparatus 10 provides an inputting screen to the human interface 11 through the interface section 108 under control of the display controller 105. The inputting screen prompts the login user to input his user authentication information through the inputting screen.

Step S1-2: The user ID information inputted as authentication information by the login user is directed to the user ID information receiving section 1001 of the receiving section 100 through the interface section 108. The user ID information receiving section 1001 sends the inputted user ID information to the user ID information determining section 101, which in turn performs authentication.

Step S1-3: The user ID information determining section 101 compares the inputted authentication information (i.e., user ID information) with the user ID information stored in the user ID information storing section 106.

If the inputted authentication information and the ID information in the user ID information coincide, the program proceeds to S1-4. If they don't coincide, the program proceeds to S1-5.

Step S1-5: The user ID information determining section 101 informs the display controller 105 of failure of the authentication, and the display controller 105 drives the human interface 11 through the interface section 108 to display the failure of the authentication. Then, the program ends.

Step S1-4: The user ID information determining section 101 informs the right-of-use determining section 103 of the success of authentication, and the right-of-use determining section 103 displays the "login user's address book" on the human interface 11.

FIG. 8 is a flowchart illustrating how the login user's address book is displayed. With reference to FIG. 8 and FIG. 7B, a description will be given of the operation in which the "login user's address book" is displayed.

Step S2-1: If the user ID information determining section 101 determines that the authentication is successful (YES at S1-3 in FIG. 7A), the right-of-use determining section 103 reads the items of destination information from the address book storing section 107, the items of destination information having authenticated login user's right-of-use. The right-of-use determining section 103 then informs the display information extracting section 104 of the items of destination information.

Step S2-2: The display information extracting section 104 arranges the extracted items of destination information in order of item number.

Step S2-3: The display controller 105 sends the extracted items of destination information as "authenticated login user's address book" to the human interface 11 through the interface section 108 for display.

FIGS. 9-11 illustrate an item of destination information #1 to an item of destination information #3 stored in the address book storing section 107, respectively.

The destination types of destination information #1 shown in FIG. 9 include NAME:X, MAIL1: aaa☐x@abc.com, MAIL2: a-Δ◊@mail.ne.jp, TEL1 xxx-ΔΔΔ-oooo, TEL2: xxx-ΔΔΔ-ooox, FAX1: xxx-ΔΔΔ-oooΔ, MEMO1: company's mailing address, and MEMO2: registration date 2015/Oct./2. Registration date does not function as a destination type but is used for management.

The NAME:X, MAIL1: aaa☐x@abc.com, TEL1: xxx-ΔΔΔ-oooo, and MEMO1: company's mailing address are associated with the right-of-use UserA1. Likewise, the NAME:X, MAIL2: a-Δ◊@mail.ne.jp, TEL1: xxx-ΔΔΔ-oooo, and FAX1: xxx-ΔΔΔ-oooΔ are associated with the right-of-use, UserB5. Also, the NAME:X, TEL2: xxx-ΔΔΔ-ooox, and MEMO2: registration date 2015/Oct./2 are associated with the right-of-use, UserC2.

Likewise, the item of destination information #2 to #3 are associated with their corresponding right-of-use.

Assume that the items of destination information #1 to #3 have been stored in the address book storing section 107, and that items of destination information are extracted in response to the login user's command. The display information extracting section 104 extracts only destination types for which the login user has a right-of-use. The display information extracting section 104 then sends the destination types to the human interface 11 for display.

FIG. 12 illustrates the "address book" for user A (i.e., UserA), displayed on the screen of the human interface 11. Likewise, FIG. 13 illustrates the "address book" for user C (i.e., UserC), displayed on the screen of the human interface 11.

When User A is successfully authenticated, the display information extracting section 104 displays the NAME, TEL1, MAIL1, TEL1, and MEMO1 as item No. 1 for user A's address book. The NAME, MAIL1, and MEMO1 are associated only with the right-of-use UserA1 shown in FIG. 9. Likewise, the display information extracting section 104 displays the NAME, MAIL1, FAX1, and MEMO1 as item No. 2 for user A's address book. The NAME, MAIL1, FAX1, and MEMO1 are associated with the right-of-use UserA2 shown in FIG. 10. Also, the display information extracting section 104 displays the NAME and MAIL1 as item No. 3 for user A's address book. The NAME and MAIL1 are associated with the right-of-use UserA3 shown in FIG. 11.

Likewise, when authentication is performed on user C who wants to use his "address book," the display information extracting section 104 displays the NAME, MAIL2, and MEMO2 as item No. 1 of user C's address book as shown in FIG. 13. The NAME, MAIL2, and MEMO2 are associated with the right-of-use UserC1 of the destination information #2 shown in FIG. 10. Likewise, the display information extracting section 104 displays the NAME, TEL2, FAX1, and MEMO2 as item No. 2 of user C's address book as shown in FIG. 13. The NAME, TEL2, FAX1, and MEMO2 are associated with the right-of-use UserC2 of the destination information #1 shown in FIG. 9.

The login user is allowed to selectively use the destination information from his "address book" displayed in the address book displaying screen.

Creating and Editing Item of Destination Information

Figure 14:
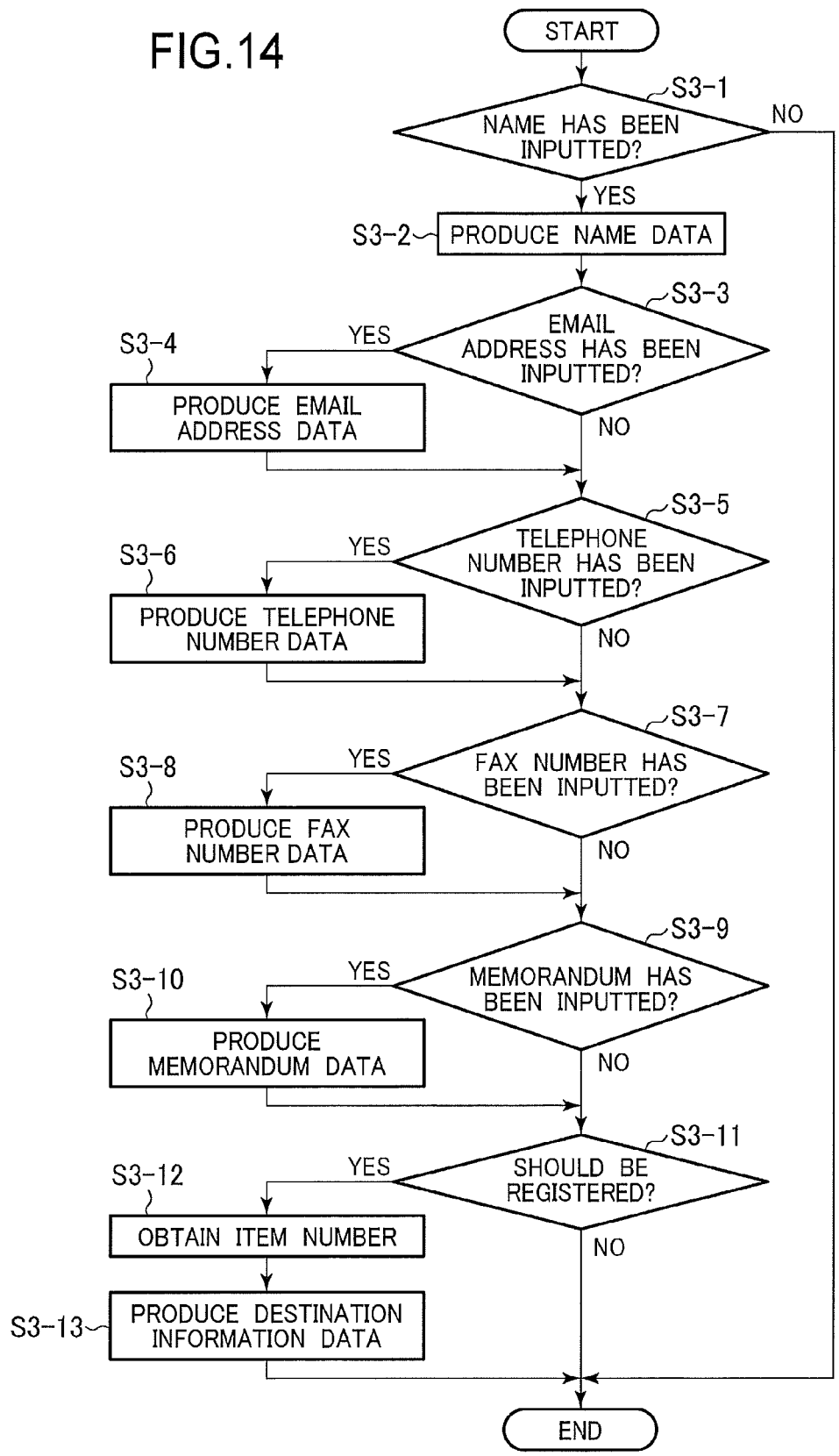
FIG. 14 is a flowchart illustrating how the destination information is produced.

FIG. 14 is a flowchart illustrating how an item of destination information is produced.

The login user selects a destination adding button that appears on a destination information producing screen displayed on the human interface 11, thereby starting to produce an item of destination information.

Assume that the user has inputted his user ID information for authentication and has been successfully authenticated by the user ID information determining section 101. The destination adding button may be displayed on the screen in which the item of destination information inputted by the login user appears on the screen. Further, a menu screen may be employed that displays a variety of functions to be selected. A selection button may be displayed on the menu screen, so that pressing the selection button activates the production of the item of destination information.

Assume that the login user will register an item of destination information when items of destination information are being displayed as the "login user's address book" on the human interface 11 as a result of the operation shown in FIG. 8.

Step S3-1: A name input box appears on the destination information producing screen. A check is made to determine whether a recipient's name, NAME, has been inputted into the name input box. Once the recipient's name has been inputted into the box, the destination information receiving section 1000 of the receiving section 100 obtains the name, and directs the obtained name to the right-of-use producing section 102. If a name is not inputted within a predetermined period of time, the program ends.

Step S3-2: The right-of-use producing section 102 in turn produces name data of the destination information.

Step S3-3: A check is made to determine whether an email address has been inputted into an email address input box. If an email address is not inputted into the email address input box, the program proceeds to S3-5.

Step S3-4: If the answer is YES at S3-3, then the right-of-use producing section 102 produces email address data, and then the program proceeds to S3-5.

Step S3-5: A check is made to determine whether a telephone number has been inputted into a telephone number input box. If the answer is NO, the program proceeds to S3-7. If the answer is YES, the program proceeds to S3-6.

Step S3-6: The right-of-use producing section 102 produces telephone number data, and then program proceeds to S3-7.

Step S3-7: A check is made to determine whether a FAX number has been inputted into a FAX number input box. If the answer is NO, the program proceeds to S3-9. If the answer is YES, the program proceeds to S3-8.

Step S3-8: The right-of-use producing section 102 produces FAX number data, and then the program proceeds to S3-9.

Step S3-9: A check is made to determine whether a memorandum has been inputted into a memorandum input box. If the answer is NO, the program proceeds to S3-11. If the answer is YES, the program proceeds to S3-10.

Step S3-10: The right-of-use producing section 102 produces memorandum data, and then the program proceeds to S3-11.

Step S3-11: The right-of-use producing section 102 makes a decision as to whether the login user has pressed a registration button displayed on the screen of the human interface 11. If the answer is YES, the program proceeds to S3-12. If the answer is NO, the program ends.

Step S3-12: The right-of-use producing section 102 obtains an item number, which is used when an item of destination information is added to the "login user's address book."

Step S3-13: The right-of-use producing section 102 then produces destination information data by associating the right-of-use, which includes the user name and an item number, with the destination type obtained in S3-2 to S3-10. In this manner, the item of destination information is produced with the destination type associated with the right-of-use.

The operation in S3-3 through S3-9 accepts some or all of the email address, telephone number, FAX number, and memorandum. Therefore, as long as at least one of the email address, telephone number, FAX number, and memorandum is inputted, the item of destination information can be produced. Also, the email address, telephone number, FAX number, and memorandum shown in FIG. 14 may be inputted into the human interface 11 in any order.

The right-of-use producing section 102 obtains the smallest one from unused item numbers in the login user's address book.

Figure 15A:
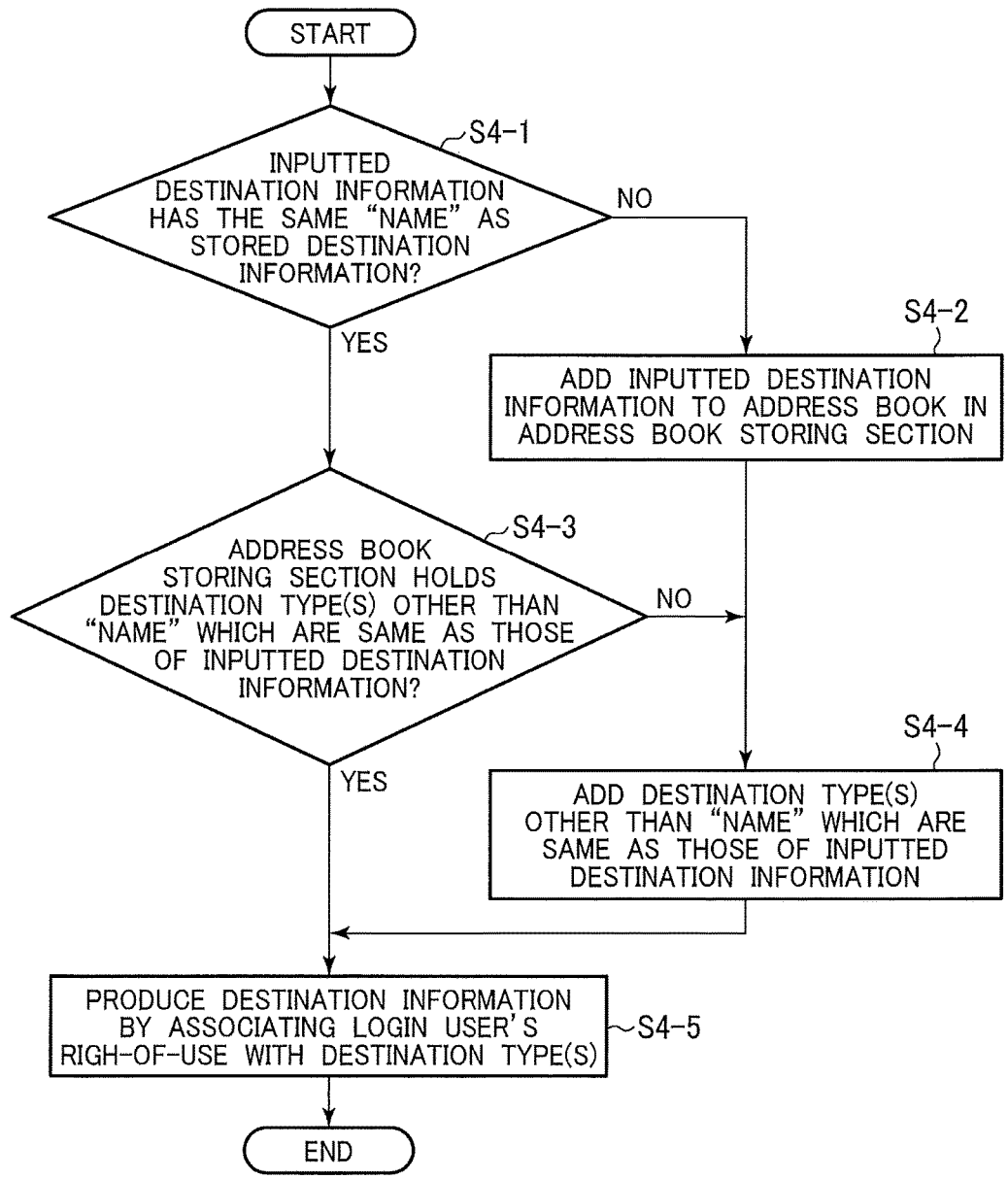
FIG. 15A is a flowchart illustrating a destination information registering process.
Figure 15B:
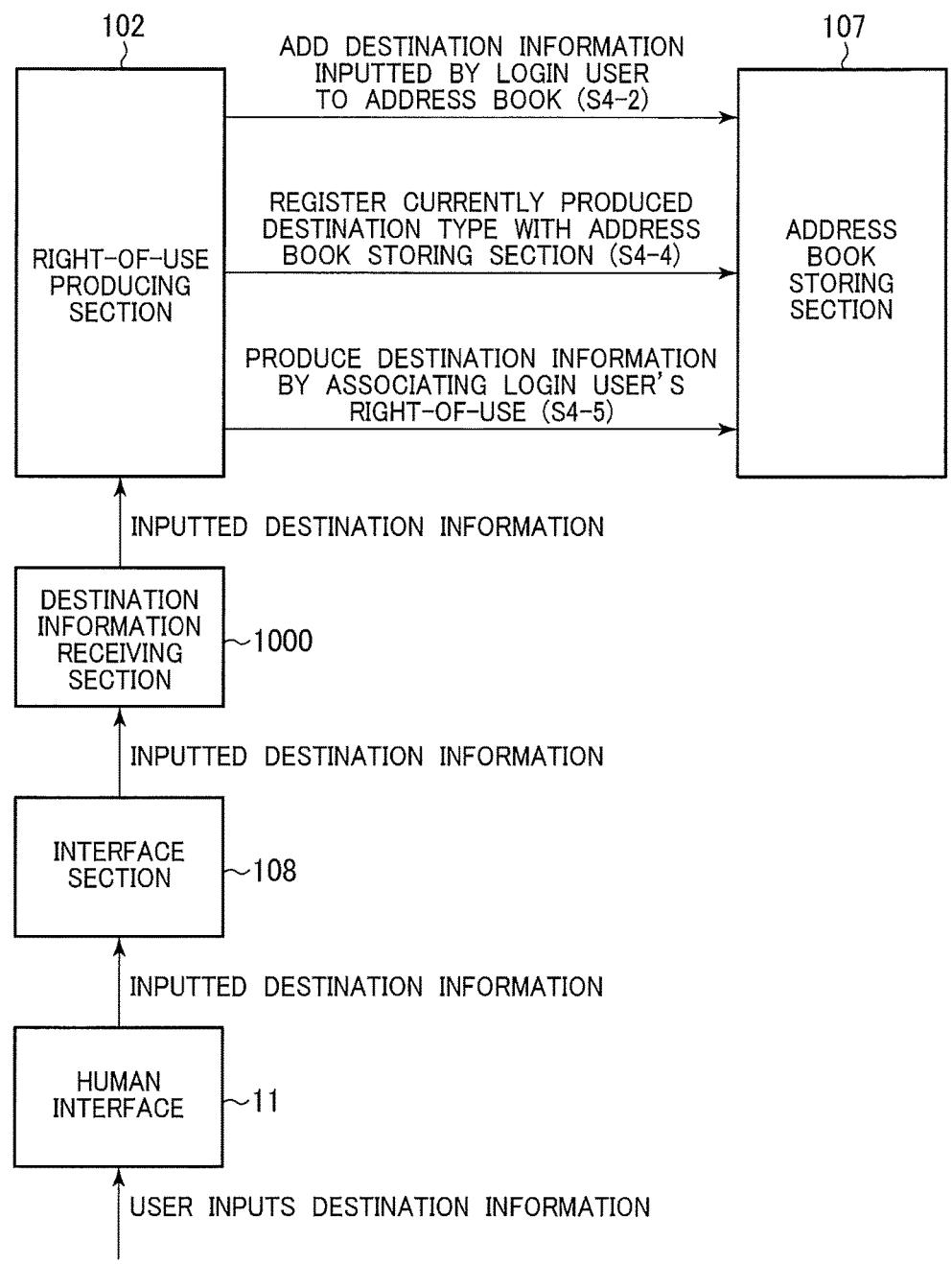
FIG. 15B illustrates a part of the configuration of the control system of the image processing apparatus according to the first embodiment.

FIG. 15A is a flowchart illustrating a destination information registering process. FIG. 15B illustrates apart of the configuration of the control system of the image processing apparatus 1. The destination information registering process will be described with reference to FIGS. 15A and 15B.

With reference to FIG. 15A, a description will be given of two operations: an operation (S4-1, S4-3, S4-5) in which a right-of-use is added to an item of destination information held in the address book storing section 107, and an operation (S4-1, S4-2, S4-4, S4-5) in which an item of destination information is first created or produced into the address book storing section 107 and then a right-of-use is added to the created item of information.

The login user inputs an item of destination information to be newly created through the human interface 11. The destination information receiving section 1000 obtains the inputted item of destination information through the interface section 108, and sends it to the right-of-use producing section 102.

The right-of-use producing section 102 produces the destination information data in accordance with the procedure shown in FIG. 14. The thus produced destination information data has one or more destination types and is subjected to the two operations shown in FIG. 15.

Step S4-1: The right-of-use producing section 102 makes a decision to determine whether the item of destination information inputted by the login user has the same "NAME" as that in the address book stored in the address book storing section 107.

Actually, the right-of-use producing section 102 compares the NAME in the item of destination information inputted by the login user with the NAME in the address book held in the address book storing section 107, thereby determining whether the two NAMEs coincide.

For example, the login user may input only a "NAME" in place of an item of destination information, in which case the right-of-use producing section 102 may check whether the inputted NAME is the same as that of an item of destination information held in the address book storing section 107. However, "NAME" is not the only information that can be used in determining whether the "login user's address book" contains destination information which has the same destination type as the items of destination information held in the address book stored in the address book storing section 107. Moreover, "NAME" may not necessarily be registered as a destination type, in which a check may be made to determine whether the "login user's address book" contains an item of destination information which has the same destination type as the items of destination information held in the address book stored in the address book storing section 107. For example, if the destination type "TEL" or "FAX" is a common item of information, a decision is made as to whether the "TEL" or "FAX" exists in the "login user's address book" and the address book in the address book storing section 107.

Alternatively, a check may be made using only a portion of a destination type. This is useful if the "login user's address book" and the address book held in the address book storing section 107 have a slightly different "NAME" which may be set by another user (e.g., "James Bond Technology Inc." and "J & B Technology Inc.")

If both the inputted item of destination information and the item of destination information held in the address book storing section 107 have the same destination type, NAME, at S4-1, the program proceeds to S4-3. If the item of destination information held in the address book storing section 107 does not have the same NAME as that of the inputted destination information, the program proceeds to S4-2.

Step S4-2: The item of destination information data produced through S3-1 to S3-13 is registered with the address book held in the address book storing section 107, and then the program proceeds to S4-4.

Step S4-3: The right-of-use producing section 102 makes a decision to determine whether an item of destination information in the address book storing section 107 holds one or more destination types except NAME which are the same as those of the produced item of destination information. If the answer is YES, then the program proceeds to S4-5. If the answer is NO, the program proceeds to S4-4.

Step S4-4: The right-of-use producing section 102 adds the one or more destination type(s) that have been are checked at S4-3 to the item of destination information in the address book in the address book storing section 107. The program then proceeds to S4-5.

Step S4-5: The right-of-use producing section 102 adds the login user's right-of-use to the one or more destination types, which have been checked at S4-3, of the item of destination information stored in the address storing section 107. This login user's right-of-use of course includes the login user's name and item number.

As described above, when the login user wants to register a new item of destination information with the address book in the address book storing section 107 or to add the login user's right-of-use to an item of destination information held in the address book storing section 107, the login user operates the human interface 11 following the procedures shown in FIGS. 14 and 15.

FIGS. 14 and 15 illustrate an operation in which a plurality of destination types are handled to create and edit an item of destination information. Alternatively, an operation can be performed in which every time a destination type is inputted through the human interface 11, the destination type is checked and added to an item of destination information currently being produced, the operation being repeated as many times as there are destination types.

Figure 16:
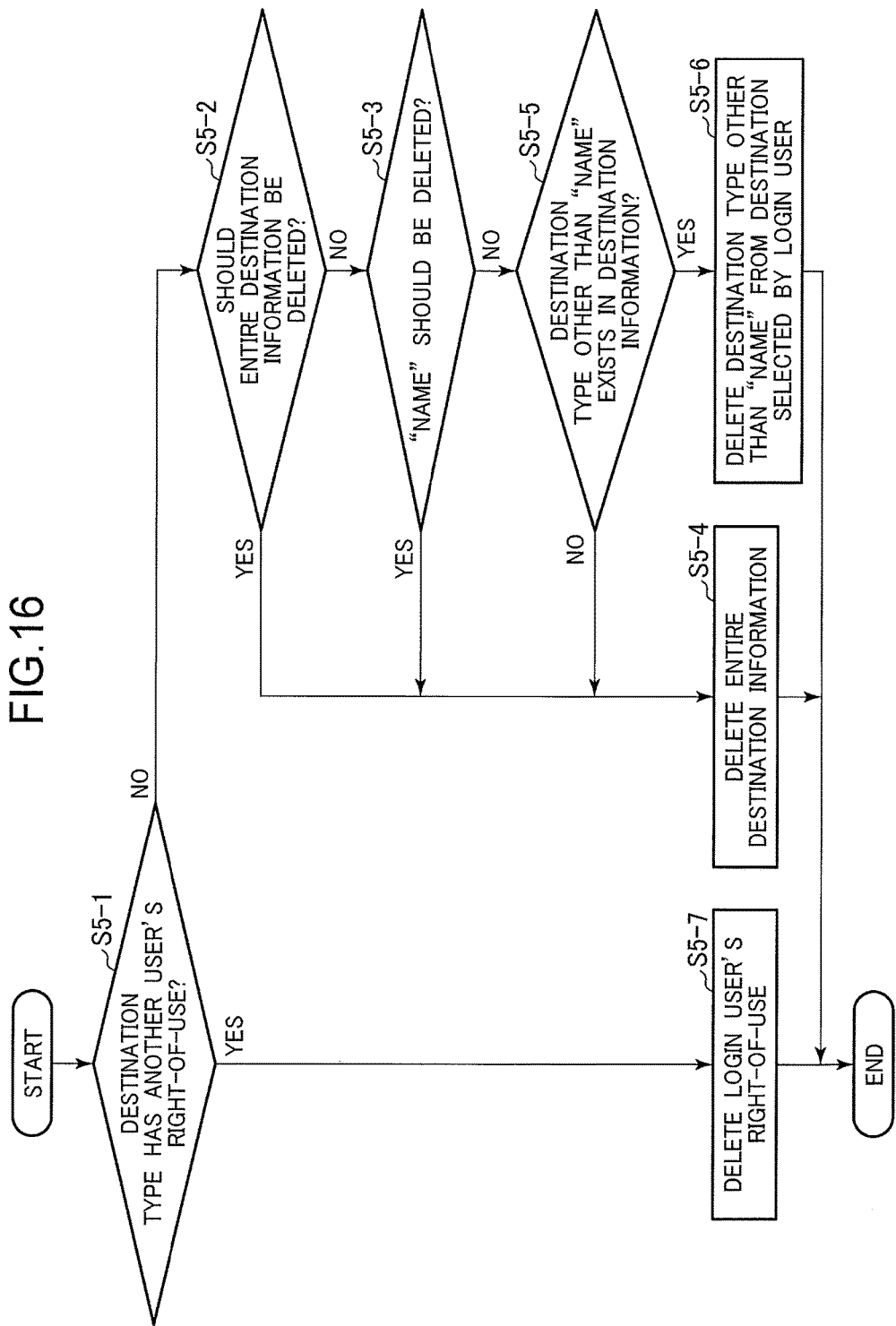
FIG. 16 is a flowchart illustrating a destination information deleting process.

FIG. 16 is a flowchart illustrating a destination information deleting process for deleting an item of destination information partially or in its entirety.

When the login user wants to delete an item of destination information from his "address book," the user ID information determining section 101 first performs authentication on the login user. If the login user is successfully authenticated, the items of destination information for which the login user's right-of-use has been set are displayed on the human interface 11.

The login user then operates the human interface 11 to select an item of destination information that he wants to delete, and then presses a deletion button on the displayed screen. The item of destination information to be deleted may be selected by "item number." Alternatively, the login user may select directly an item of destination information displayed on the screen if the human interface 11 takes the form of a touchscreen. Likewise, when the login user wants to delete destination types individually, the login user operates the human interface 11 to select an individual destination type that should be deleted, and then presses a deletion button on the displayed screen, so that the destination types can be deleted one by one.

The item of destination information selected by the login user and the deletion command are directed to the destination information receiving section 1000 through the interface section 108. The destination information receiving section 1000 sends the item of destination information selected by the login user and the deletion command to the right-of-use producing section 102.

Step S5-1: The right-of-use producing section 102 reads the selected item of destination information from the address book held in the address book storing section 107. The right-of-use producing section 102 then extracts a destination type from the read item of destination information, the destination type having a right-of-use given to the login user. The right-of-use producing section 102 then checks whether another registered user also has the right-of-use for the destination type. If the answer is NO at S5-1, the program proceeds to S5-2. If the answer is YES at S5-7, the program proceeds to S5-3.

S5-2: A check is made to determine whether the login user wants to delete the selected item of destination information in its entirety. If the answer is YES at S5-2, the program proceeds to S5-4. If the answer is NO at S5-2, the program proceeds to S5-3.

Step S5-3: If another registered user does not have a right-of-use for the destination type, the right-of-use producing section 102 makes a decision to determine whether "NAME" is a destination type that should be deleted.

Step S5-4: If "NAME" is the destination type that should be deleted," the right-of-use producing section 102 deletes the destination information in its entirety.

Step S5-5: If "NAME" is not the destination type that should be deleted (NO at S5-3), the right-of-use producing section 102 makes a decision to determine whether a destination type other than "NAME" is present in the item of destination information. If the answer is NO, the program proceeds to S5-4. If the answer is YES, then the program proceeds to S5-6.

S5-6: The right-of-use producing section 102 deletes that destination type from the item of destination information selected by the login user.

S5-7: If another registered user also has a right-of-use for the destination type, the right-of-use producing section 102 deletes only the right-of-use of the login user.

{Effects of First Embodiment}

According to the first embodiment, the right-of-use associated with the login user ID information may be added to the destination type inputted by the login user. Thus, when the "login user's address book" is displayed, only information for which the login user has a right-of-use can be displayed, so that no other registered user can see the information registered by the login user. This keeps the login user's information confidential.

Second Embodiment

A second embodiment will be described with reference to FIGS. 17-23. The second embodiment differs from the first embodiment in that a message producing section 111 and a destination information update controlling section (destination update controlling section) 112 are added. Elements common to those of the first embodiment have been given like reference characters and their detailed description is omitted.

{Configuration}

Figure 17:
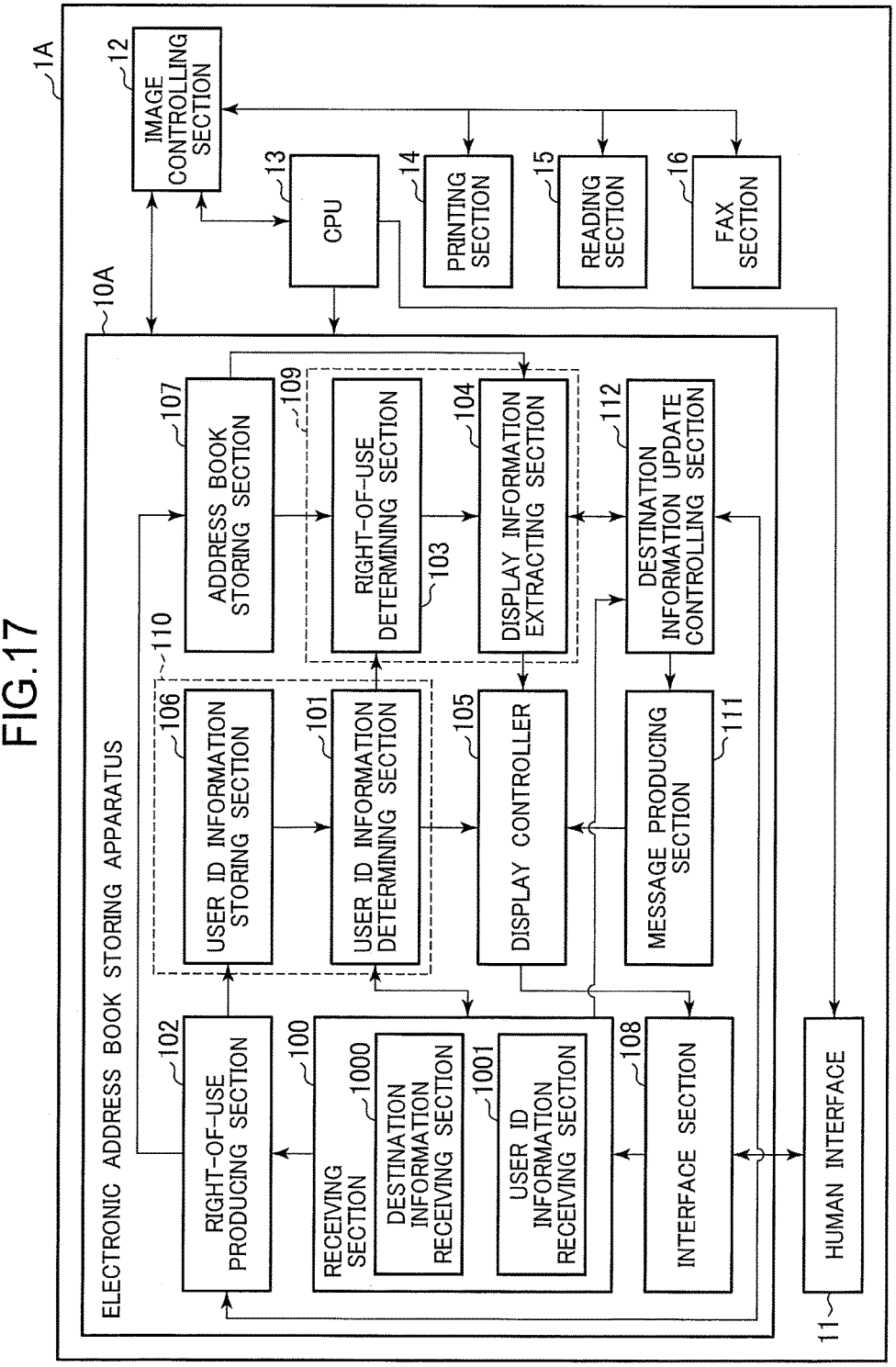
FIG. 17 illustrates the configuration of a control system of an image processing apparatus according to a second embodiment.

FIG. 17 illustrates the configuration of a control system of an image processing apparatus 1A according to the second embodiment. The image processing apparatus 1A includes an electronic address book storing apparatus 10A, a human interface 11, an image controlling section 12, a central processing unit (CPU) 13, a printing section 14, a reading section 15, and a facsimile (FAX) section 16.

The electronic address book storing apparatus 10A includes a receiving section 100, a user ID information determining section 101, a right-of-use producing section 102, a right-of-use determining section 103, a display information extracting section 104, a display controller 105, a user ID information storing section 106, an address book storing section 107, an interface section 108, the message producing section 111, and the destination information update controlling section 112.

The destination information update controlling section 112 controls the process for updating the destination information. Specifically, when a destination type has been updated (i.e., changed) by another registered user, the destination information update controlling section 112 determines whether the updated destination type should be shared with other registered users who have rights-of-use associated with the destination information before updating. The destination information update controlling section 112 also performs a process in which the login user associates his right-of-use with the updated destination information.

FIG. 18 illustrates the configuration of the right-of-use associated with the destination type. The rights-of-use includes "user name" and "item number" followed by "-(hyphen)," update flag," and "updated destination type."

The right-of-use includes the "update flag" and the "updated destination type." The "update flag" indicates whether another registered user has switched one of destination types, which he has set his right-of-use, to another destination type. Updating a destination type results in a specific change to the destination type made by another registered user. The update flag "1" indicates that the destination type has been updated, and the update flag "0" indicates that the destination type has not been updated yet.

In order for the user to easily identify the added information (i.e., update flag and updated destination type), a hyphen is inserted between the item number and the update flag.

The hyphen may be replaced with another symbol or character as long as the user can easily recognize the updated destination type without difficulty.

The message producing section 111 produces a reflection inquiring screen 30 used for informing that the updated destination type has been notified to registered users and for inquiring whether a destination type for which the login user's right-of-use has been set should be changed to reflect the updated destination type. The message producing section 111 then sends the reflection inquiring screen 30 to the display controller 105

{Operation of Second Embodiment}

The address book held in the image processing apparatus 10A can be displayed by following the procedure shown in FIG. 7A. The operation for displaying the "login user's address book" will be described with reference to FIG. 7A.

Step S1-1: When the login user operates the human interface 11 to command to display the address book, the CPU 13 informs the electronic address book storing apparatus 10A of the command. The user ID information determining section 101 displays an inputting screen that prompts the login user to input his user authentication information through the inputting screen. The inputting screen is outputted to the human interface 11 through the interface section 108 under control of the display controller 105.

Step S1-2: The user ID information inputted as authentication information by the login user is directed to the user ID information receiving section 1001 of the receiving section 100 through the interface section 108. The user ID information receiving section 1001 sends the inputted user ID information to the user ID information determining section 101, which in turn performs authentication.

Step S1-3: The user ID information determining section 101 compares the inputted user ID information with the user ID information stored in the user ID information storing section 106.

If the user ID information and the inputted authentication information coincide, the program proceeds to S1-4. If they don't coincide, the program proceeds to S1-5.

At S1-5, the user ID information determining section 101 informs the display controller 105 of failure of the authentication, and the the display controller 105 drives the human interface 11 through the interface section 108 to display the failure of the authentication to the login user. Then, the program ends.

At S1-4: The user ID information determining section 101 informs the right-of-use determining section 103 of the success of authentication, and the right-of-use determining section 103 displays the "login user's address book" on the human interface 11.

Figure 19A:
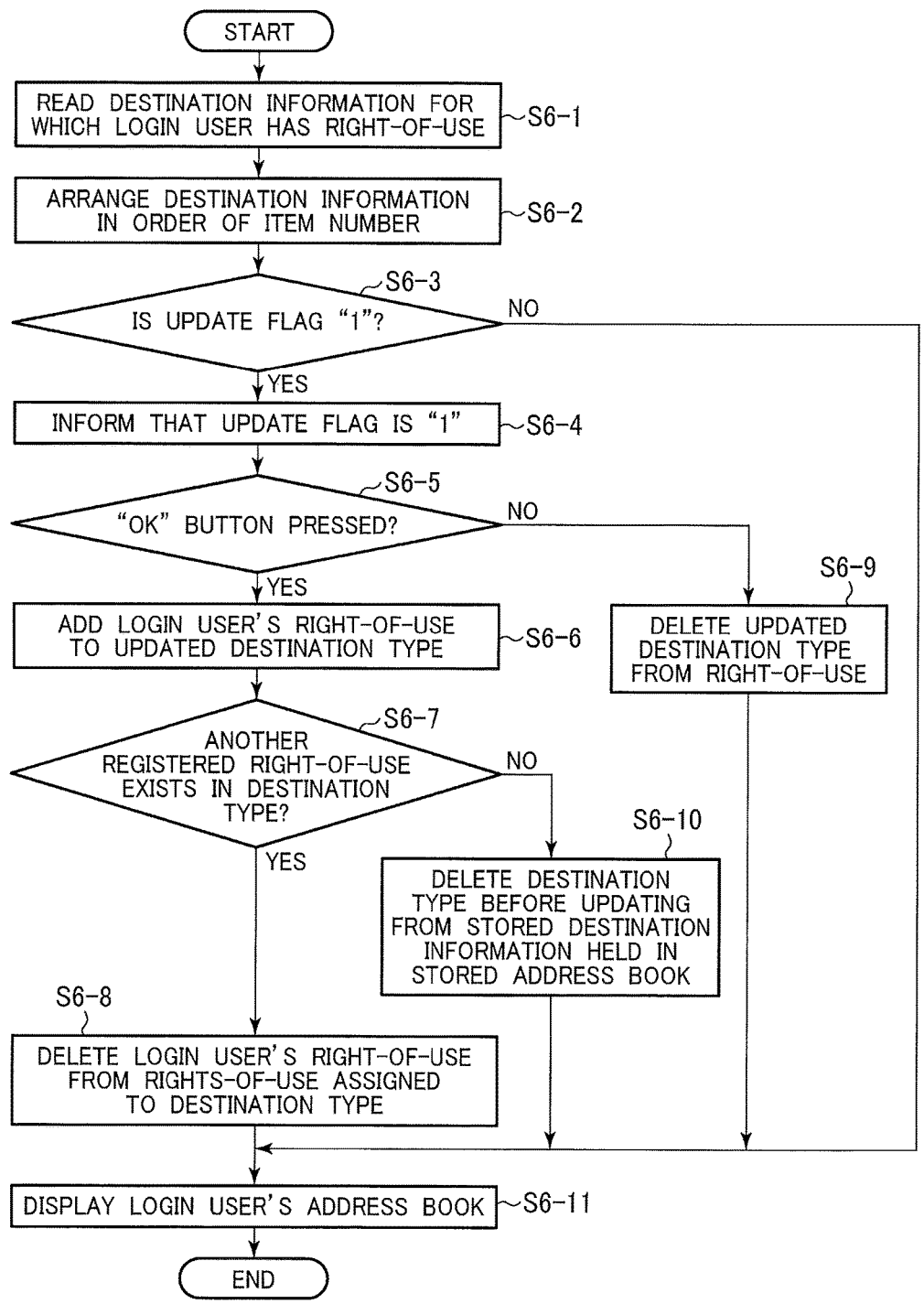
FIG. 19A is a flowchart illustrating the operation for displaying the address book.

FIG. 19A is a flowchart illustrating the operation for displaying the login user's address book to the login user, and the operation for deleting the right-of-use, destination type, or update information. FIG. 19B illustrates apart of the configuration of the control system of the image processing apparatus. The operation for displaying the address book will be described with reference to FIG. 19A and FIG. 19B.

The operation illustrated in FIG. 19A is useful, for example, when one of the registered users knows that his client's telephone number has changed and wants to inform other registered users who also communicate with the client that the client's telephone number has changed.

Step S6-1: When it is determined at S1-3 shown in FIG. 7A that authentication is successful, the user ID information determining section 101 informs the right-of-use determining section 103 of the success of authentication. The right-of-use determining section 103 in turn reads from the address book storing section 107 the destination information for which the login user has his right-of-use.

Step S6-2: The display information extracting section 104 extracts items of destination information, for which the login user has his right-of-use, from the address book held in the address book storing section 107. The display information extracting section 104 then arranges the extracted items of destination information in order of item number, and then sends them to the destination information update controlling section 112.

Step S6-3: The destination information update controlling section 112 makes a decision as to whether the update flag of the right-of-use assigned to the destination information, which is obtained from the display information extracting section 104, is "1". When the update flag is "0," the program jumps to S6-11.

Step S6-4: When the update flag is "1" (YES at S6-3), the destination information update controlling section 112 informs the message producing section 111 of the update flag "1," the update flag "1" indicating that another registered user changed or updated the destination type that he uses. The message producing section 111 produces the reflection inquiring screen 30 that inquires of the login user whether the "login user's address book" should reflect the destination type updated by another registered user, and then sends the reflection inquiring screen 30 to the display controller 105. The display controller 105 in turn drives the human interface 11 via the interface section 108 to display the reflection inquiring screen 30 to the login user.

FIG. 20 illustrates an exemplary screen on which the reflection inquiring screen 30 is being displayed. The reflection inquiring screen 30 is to inform the login user that another registered user has changed or updated the destination type that he uses, and also to prompt the login user to check whether the "login user's address book" should reflect the updated destination type. The reflection inquiring screen 30 includes, for example, an OK button 31, a non-reflection button 32, and a guidance message 33. The guidance message would look like "Another registered user has changed the destination type that he uses as follows: xxx-ΔΔΔ-oooo→xxx-ΔΔΔ-oxox. Should your address book reflect this information?."

Step S6-5: A check is made to determine whether the login user has pressed the OK button 31. If the answer is NO (i.e., the non-reflection button 32 is pressed), then the the message producing section 111 sends non-reflection information, which indicates that the "login user's address book" should not reflect the destination type updated by another registered user, to the receiving section 100 via the interface section 108, and then to the destination information update controlling section 112.

If the login user presses the OK button 31 at S6-5 (YES at S6-5), the message producing section 111 sends information, which indicates that the "login user's address book" should reflect the destination type updated by another registered user, to the receiving section 100 via the interface section 108 and also to the destination information update controlling section 112. In order for the login user's address book reflect the updated destination type, the login user's right-of-use requires to be associated with the updated destination type. Thus, the destination information update controlling section 112 notifies the right-of-use producing section 102 that the login user's right-of-use should be associated with the updated destination type.

Step S6-6: The right-of-use producing section 102 first reads the updated destination type (TEL3) from the right-of-use (UserA1-1TEL3) which is associated with the destination type (e.g., TEL1:xxx-ΔΔΔ-oooo) of the destination information stored in the address book storing section 107, and then associates the login user's right-of-use with the updated destination type (TEL3).

Step S6-9: The destination information update controlling section 112 notifies the right-of-use producing section 102 that the updated information should be deleted from the right-of-use. The right-of-use producing section 102 in turn deletes the updated destination type (e.g., TEL3) from the right-of-use (e.g., UserA1-1TEL3 in FIG. 21) that is associated with the login user's destination type (e.g., TEL1: xxx-ΔΔΔ-oooo) held in the address book storing section 107, and then sets the update flag "1" to "0".

Deletion of the updated destination type from the right-of-use (e.g., UserA1-1TEL3 in FIG. 21) is achieved by changing the update flag from "1" to "0," and then deleting the "updated destination type (e.g., TEL3)" from the right-of-use (UserA1-1TEL3). In other words, the right-of-use before deletion is, for example, UserA1-1TEL3, and the right-of-use after deletion will look, for example, UserA1-0.

FIG. 21 illustrates an exemplary list of items of destination information in which one of the records has destination type "TEL1: xxx-ΔΔΔ-oooo" associated with a right-of-use "UserA1-1TEL3." A description will be given of the operation for associating the login user's right-of-use with the "updated destination type.

In FIG. 21, it is assumed that "UserA" is the login user who selected "reflection." It is also assumed that the destination information selected by the login user has a destination type, "TEL1," and the current right-of-use for the destination type, "UserA1-1TEL3." The right-of-use "UserA1-1TEL3" consists of user name "UserA," item number "1," update flag "1," and updated destination type, "TEL3." FIG. 21 assumes that User B was using TEL1 and now has switched from TEL1 to TEL3. UserB wants to inform UserA, who is also currently using TEL1, that UserB has switched the destination type listed in his "address book" from TEL1 to TEL3 "UserA1-1TEL3" shown in FIG. 21 informs UserA that a registered user (UserB in this case) has updated the destination type in the "registered user's address book" from TEL1 to TEL3. Referring to FIG. 21, UserB now has the right-of-use for TEL3. Thus, it can be understood that the registered user who has updated the destination type is UserB.

The right-of-use producing section 102 refers to the current right-of-use "UserA1-1TEL3", thereby obtaining "TEL3" as the updated destination type. The right-of-use producing section 102 then combines "TEL3" with the right-of-use for UserA.

Step S6-7: The right-of-use producing section 102 makes a decision as to whether another registered user's right-of-use has been associated with the destination type.

Step S6-10: If another registered user's right-of-use has not been associated with the destination type before updating (NO at S6-7), the right-of-use producing section 102 deletes the destination type before updating from the item of destination information held in the address book storing section 107.

Step S6-8: If another registered user's right-of-use has been associated with the destination type (YES at S6-7), the right-of-use producing section 102 deletes only the login user's right-of-use from the item of destination information held in the address book storing section 107.

Once the destination information in the address book storing section 107 has been completely updated through S6-8, S6-9, and S6-10, the right-of-use producing section 102 notifies the destination information update controlling section 112 of the completion. The destination information update controlling section 112 in turn notifies the display information extracting section 104 of the completion. The display information extracting section 104 reads the items of destination information having the login user's right-of-use from the address book storing section 107, and arranges the thus read items of destination information in order of item number before sending the items of destination information to the display controller 105.

Step S6-11: The display controller 105 drives the human interface 11 via the interface section 108, thereby displaying the "login user's address book."

Figure 22A:
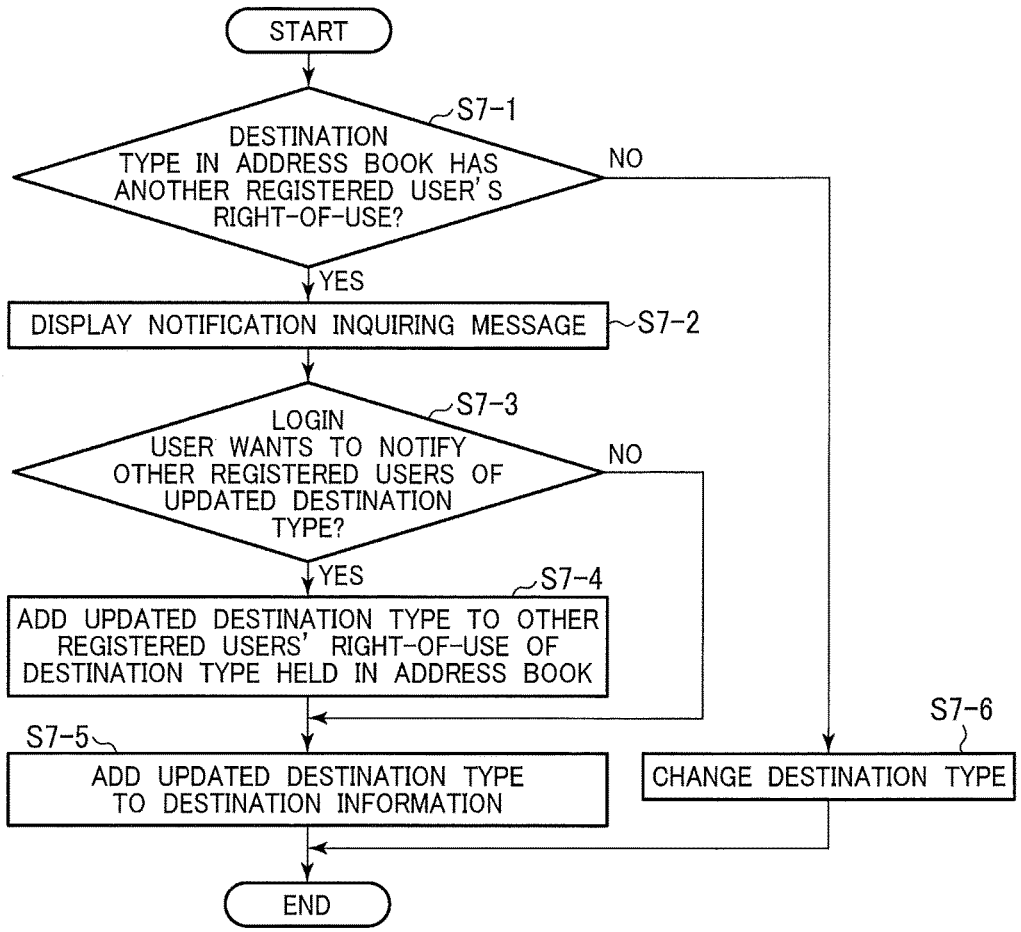
FIG. 22A is a flowchart illustrating the operation for changing the destination information.
Figure 22B:
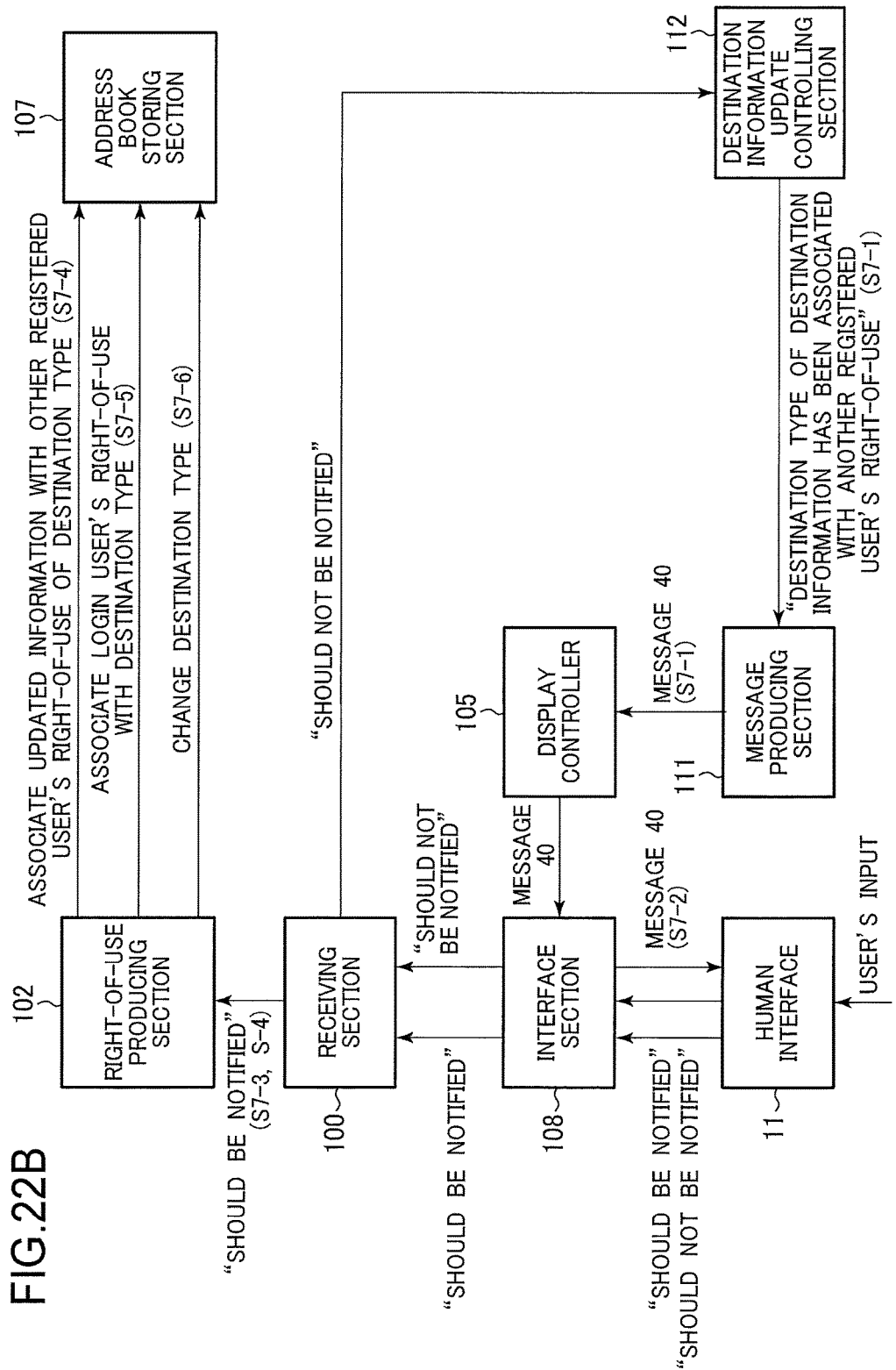
FIG. 22B illustrates a part of the configuration of the control system of the image processing apparatus according to the second embodiment.

FIG. 22A is a flowchart illustrating the operation for changing the destination information. FIG. 22B illustrates a part of the configuration of the control system of the image processing apparatus 1A. The operation for changing the destination information will be described with reference to FIG. 22A and FIG. 22B. The operation in FIG. 22A is useful when a login user wants some or all of the registered users to know a new client having a new NAME that he is registering or to set their right-of-use for the new client.

When the login user alters the destination information in his "address book," the user authentication result and the "login user's address book" are displayed on the human interface 11.

For example, the login user selects an item of destination information to be altered from his "address book," and then presses a destination editing button, which are displayed on the human interface 11. Once the login user has inputted a new destination type and the editing command, the destination information receiving section 1000 of the receiving section 100 receives the new destination type, and then sends it to the right-of-use producing section 102.

Step S7-1: The right-of-use producing section 102 makes a decision as to whether the destination type of the destination information held in the address book storing section 107 has been associated with another registered user's right-of-use.

Step S7-6: If the destination type of the destination information has not been associated with another registered user's right-of-use (NO at S7-1), the right-of-use producing section 102 changes the destination type.

If the destination type of the destination information has been associated with another registered user's right-of-use (YES at S7-1), the right-of-use producing section 102 notifies the destination information update controlling section 112 that the destination type has been associated with the another registered user's right-of-use. Likewise, the destination information update controlling section 112 informs the message producing section 111 that the destination type has been associated with the another registered user's right-of-use. The message producing section 111 in turn produces a notification inquiring screen (message) 40 that inquires of the login user whether the update information should be notified to other registered users, and then sends the notification inquiring message to the display controller 105.

Step S7-2: The display controller 105 drives the human interface 11 via the interface section 108, thereby displaying the notification inquiring screen 40 on the human interface 11.

Figure 23:
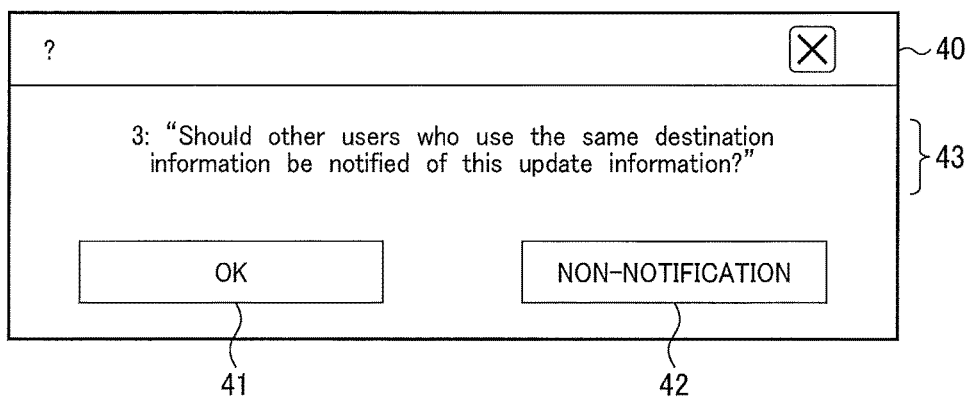
FIG. 23 is illustrates a screen that shows a notification inquiring message.

FIG. 23 illustrates the notification inquiring screen 40. The notification inquiring screen 40 is to inquire of the login user whether other registered users should be notified of the updated information. The notification inquiring screen 40 includes, for example, an OK button 41, a non-notification button 42, and a guidance message (message) 43 "3: xxx-ΔΔΔ-oxox. The guidance is, for example, "Should other users who use the same destination information be notified of this update information?"

S7-3: A check is made to determine whether the login user wants to notify other registered users of the updated information.

If the login user does not want to notify the other registered users of the updated information (NO at S7-3), the login user presses the non-reflection button 42 displayed on the human interface 11. The output of the non-reflection button 42 is sent to the receiving section 100 via the interface section 108, and is sent from the receiving section 100 to the destination information update controlling section 112. The destination update controlling section 112 sends to the right-of-use producing section 102 a notification that the updated information should not be notified. The right-of-use producing section 102 deletes the login user's right-of-use from the item of destination information held in the address book storing section 107, then adds the updated destination type to the item of destination information, and finally associates the login user's right-of-use with the updated destination type.

If the login user wants to notify the other registered users of the updated destination type (YES at S7-3), the login user presses the OK button 41. The output of the OK button 41 is sent to the receiving section 100 via the interface section 108, and is sent from the receiving section 100 to the destination information update controlling section 112. The destination update controlling section 112 sends to the right-of-use producing section 102 a notification that the updated destination type should be notified to the other users.

Step S7-4: The right-of-use producing section 102 associates the updated information (e.g., "TEL3" of "UserA1-1TEL3" shown in FIG. 21) with the other registered user's right-of-use of destination type (e.g., TELL xxx-ΔΔΔ-oooo) held in the address book storing section 107. As a result, the other registered user's right-of-use would look like "UserA1-1TEL3" as shown in FIG. 21.

Associating the updated information with the right-of-use is equivalent to the changing of the update flag in the right-of-use from "0" to "1" and then combining the updated destination type with the right-of-use.

Step S7-5: The right-of-use producing section 102 deletes the login user's right-of-use from the destination type held in the address book storing section 107, then adds the updated destination type to the item of destination information, and finally associates the login user's right-of-use with the updated destination type.

{Effects of Second Embodiment}

The second embodiment provides the same effects as the first embodiment. Further, when a login user updates information, the login user can decide whether the updated information should be shared with other registered users. Also, the login user decides that the updated information should be shared with other registered users, the updated information is shared only among the registered users who have the same information before updating. This helps keep the login user's information confidential.

Other Embodiments

In addition to the aforementioned embodiments, the following modification may be made.

The first and second embodiments have been described in terms of an MFP as an image processing apparatus. The present invention may be applicable to a variety of apparatus as long as they are equipped with an address book and can be shared by a plurality of users. Such an apparatus may be an electronic address book storing apparatus employed in apparatus including a facsimile machine and a scanner.

The first and second embodiments have been described in terms of the configuration in which a screen is displayed on a human interface of an image processing apparatus and the login user operates the buttons on the screen. The display device and inputting device may be of any type as long as the login user can communicate with the image processing apparatus. The display device and inputting device may be on an outside PC so that they are operated remotely over a network. Further, the displaying and inputting devices may be on a mobile phone so that they are operated by wireless communication.

The first and second embodiments have been described in terms of the configuration in which "NAME" is used as a destination type and the destination type is added or deleted. However, the items of destination information may also be searched in terms of other key word, for example, MAIL (electronic mail address), TEL (telephone number), or FAX (facsimile number).

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A multi-function peripheral (MFP) with an electronic address book storing apparatus, comprising:
    a user authenticating section to authenticate a login user at the MFP;
    a destination information storing section configured to store a plurality of items of destination information, each item of-destination information including destination types and rights-of-use, each of the destination types being indicative of a type of destination, each of the rights-of-use being associated with a corresponding registered user, each of the destination types being combined with at least one of the rights-of use;
    an information extracting section configured to extract one or more destination types from the destination information storing section in response to the login user's command, the extracted one or more destination types being combined with the login user's right-of-use;

a display controller configured to display, at the MFP, the extracted one or more destination types to the login user;

an inputting-and-displaying section configured to receive at least one destination type from the login user;

a destination information obtaining section configured to obtain the at least one destination type from the inputting-and-displaying section; and a destination information producing section configured to determine whether or not the obtained at least one destination type is the same destination type included in the plurality of items of destination information, to combine, if the obtained at least one destination type is the same destination type included in the plurality of items of destination information, the login user's right-of-use with the same destination type included in the plurality of items of destination information, and to create, if the obtained at least one destination type is not the same destination type included in the plurality of items of destination information, a new item of destination information by combining the obtained at least one destination type with the login user's right-of-use, wherein the destination information producing section is configured to determine whether or not the obtained at least one destination type is the same destination type included in the plurality of items of destination information based on each of a case in which the obtained at least one destination type is determined to be a name of destination and a case in which the obtained at least one destination type is determined to be a destination type other than a name of destination, and wherein the destination types are stored by the destination information storing section prior to authenticating the login user at the MFP and include one or more items of information from among the following items of information: a name of the login user, a telephone number of the login user, a fax number of the login user, and an email of the login user.

2. The MFP with the electronic address book storing apparatus according to claim 1 further comprising a destination type update controlling section, wherein when the login user updates the destination type for which the login user's right-of-use has been set, the destination type update controlling section combines the updated destination type with the right-of-use associated with the destination type before being updated.

3. The MFP with the electronic address book storing apparatus according to claim 2, wherein upon the login user's command inputted through the inputting-and-displaying section, the destination update controlling section drives the inputting-and-displaying section to display the updated destination type combined with the right-of-use associated with the destination type before being updated.

4. The MFP with the electronic address book storing apparatus according to claim 2 further comprising a message producing section configured to produce a message inquiring of the login user whether other registered users should be notified of the updated destination type, the message being produced when the login user has updated a destination type of one of the items of destination information.

5. The MFP with the electronic address book storing apparatus according to claim 1, wherein the display controller drives the inputting-and-displaying section to display the items of destination information extracted by the information extracting section.

6. The MFP with the electronic address book storing apparatus according to claim 1, wherein, the right-of-use includes a number indicative of an order in which the destination type combined with the right-of-use is listed; and the display controller displays the extracted one or more destination types listed in the order.

7. A method of storing an electronic address book in a multi-function peripheral (MFP), the electronic address book having a plurality of items of destination information, each item of destination information including destination types and rights-of-use, each of the destination types being indicative of a type of destination, each of the rights of use being associated with a corresponding registered user, each of the destination types being combined with at least one of the rights-of use, comprising:

authenticating a login user's ID information at the MFP against preregistered items of user ID information;

extracting one or more destination types from the destination information in response to a login user's command, the extracted one or more destination types being combined with the login user's right-of-use, the one or more destination types including one or more items of information from among the following items of information: a name of the login user, a telephone number of the login user, a fax number of the login user, and an email of the login user;

displaying, at the MFP, the extracted one or more destination types to the login user;

receiving at least one destination type from the login user;

determining whether or not the received at least one destination type is the same destination type included in the plurality of items of destination information;

combining, if the received at least one destination type is the same destination type included in the plurality of items of destination information, the login user's right-of-use with the same destination type included in the plurality of items of destination information;

creating, if the received at least one destination type is not the same destination type included in the plurality of items of destination information, a new item of destination information by combining the obtained at least one destination type with the login user's right-of-use; and wherein the determining whether or not the obtained at least one destination type is the same destination type included in the plurality of items of destination information is determined in each of a case in which the obtained at least one destination type is determined to be a name of destination and a case in which the obtained at least one destination type is determined to be a destination type other than a name of destination.

* * * * *